(12) United States Patent
Matsuyama et al.

(10) Patent No.: US 9,021,183 B2
(45) Date of Patent: Apr. 28, 2015

(54) DATA STORAGE APPARATUS AND APPARATUS AND METHOD FOR CONTROLLING NONVOLATILE MEMORIES

(75) Inventors: Motohiro Matsuyama, Hino (JP); Kyosuke Takahashi, Higashiyamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 740 days.

(21) Appl. No.: 13/311,403

(22) Filed: Dec. 5, 2011

(65) Prior Publication Data

US 2012/0166711 A1 Jun. 28, 2012

(30) Foreign Application Priority Data

Dec. 24, 2010 (JP) ................................. 2010-288830

(51) Int. Cl.
G06F 12/00 (2006.01)
G06F 13/00 (2006.01)
G06F 11/10 (2006.01)

(52) U.S. Cl.
CPC ...................................... G06F 11/10 (2013.01)

(58) Field of Classification Search
None
See application file for complete search history.

(56) References Cited

U.S. PATENT DOCUMENTS

| | | | |
|---|---|---|---|
| 5,737,344 A | 4/1998 | Belser et al. | |
| 5,809,516 A | 9/1998 | Ukai et al. | |
| 6,742,159 B2 | 5/2004 | Sakurai | |
| 7,117,421 B1 | 10/2006 | Danilak | |
| 7,793,197 B2 | 9/2010 | Ito et al. | |
| 8,554,997 B1 * | 10/2013 | Bonwick et al. | 711/114 |
| 2001/0056567 A1 | 12/2001 | Sakurai | |
| 2004/0153961 A1 * | 8/2004 | Park et al. | 714/800 |
| 2006/0143553 A1 | 6/2006 | Takahashi et al. | |
| 2008/0034154 A1 * | 2/2008 | Lee et al. | 711/103 |
| 2008/0126682 A1 * | 5/2008 | Zhao et al. | 711/103 |
| 2008/0147968 A1 * | 6/2008 | Lee et al. | 711/103 |
| 2009/0044078 A1 | 2/2009 | Vogan et al. | |
| 2009/0150748 A1 | 6/2009 | Egner et al. | |
| 2009/0307418 A1 | 12/2009 | Chen et al. | |
| 2009/0327803 A1 | 12/2009 | Fukutomi et al. | |

(Continued)

FOREIGN PATENT DOCUMENTS

| | | |
|---|---|---|
| JP | H08-321138 | 12/1996 |
| JP | 2002-007225 | 1/2002 |

(Continued)

OTHER PUBLICATIONS

Office Action mailed Jun. 11, 2013 in JP Pat App No. 2010-288829.

(Continued)

*Primary Examiner* — Sean D Rossiter
(74) *Attorney, Agent, or Firm* — Knobbe Martens Olson & Bear LLP

(57) ABSTRACT

According to one embodiment, a data storage apparatus comprises a channel controller, an encoding module, and a data controller. The channel controller is configured to control data input to, and output from, nonvolatile memories for channels. The encoding module is configured to generate encoded data for which an inter-channel error correction process, using data stored in each of the nonvolatile memories. The data controller is configured to manage the encoded data in units of logic blocks when the channel controller writes the encoded data in parallel to the channels, and to allocate parity data contained in the encoded data to one plane in each logic block.

12 Claims, 9 Drawing Sheets

(56) References Cited

U.S. PATENT DOCUMENTS

| | | | |
|---|---|---|---|
| 2010/0115183 A1 | 5/2010 | Araki et al. | |
| 2010/0262755 A1 | 10/2010 | Becker et al. | |
| 2011/0066883 A1 | 3/2011 | Dachiku | |
| 2011/0258380 A1* | 10/2011 | Goss et al. | 711/114 |
| 2012/0054413 A1* | 3/2012 | Brandt | 711/103 |
| 2012/0166911 A1* | 6/2012 | Takahashi et al. | 714/758 |
| 2012/0260150 A1* | 10/2012 | Cideciyan et al. | 714/773 |
| 2014/0156966 A1* | 6/2014 | Ellis et al. | 711/173 |

FOREIGN PATENT DOCUMENTS

| | | |
|---|---|---|
| JP | 3371044 | 11/2004 |
| JP | 2005-528712 | 9/2005 |
| JP | 2006-190346 | 7/2006 |
| JP | 2007-274239 A | 10/2007 |
| JP | 2008-508632 | 3/2008 |
| JP | 2010-015195 | 1/2010 |
| JP | 2010-108246 A | 5/2010 |
| JP | 2010-250816 A | 11/2010 |
| JP | 2011-060217 | 3/2011 |
| WO | WO 03/102965 A1 | 12/2003 |
| WO | WO 2009/042554 A1 | 4/2009 |

OTHER PUBLICATIONS

Japanese Office Action dated Jun. 11, 2013 for Japanese Application No. 2010-288830.

* cited by examiner

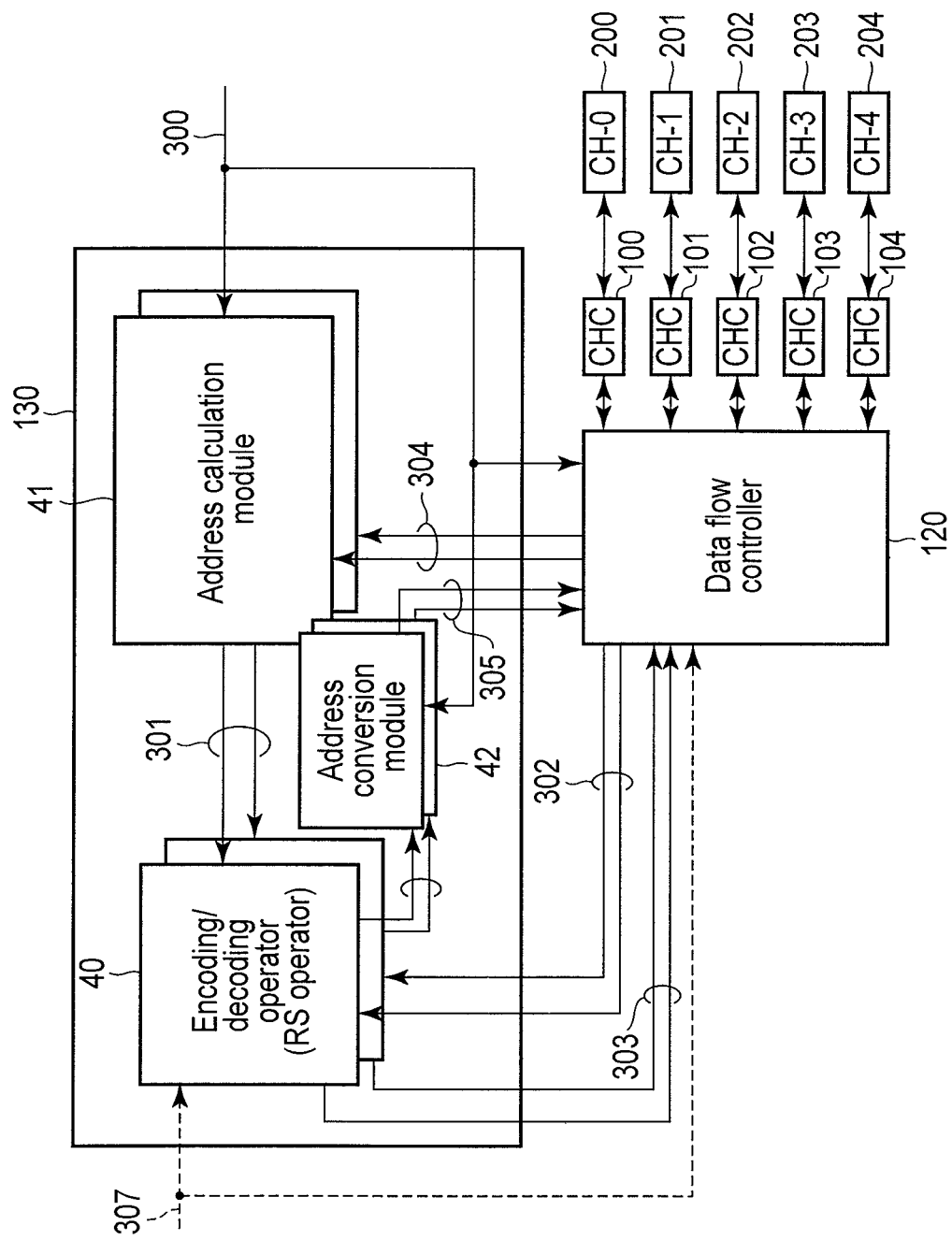
F I G. 3

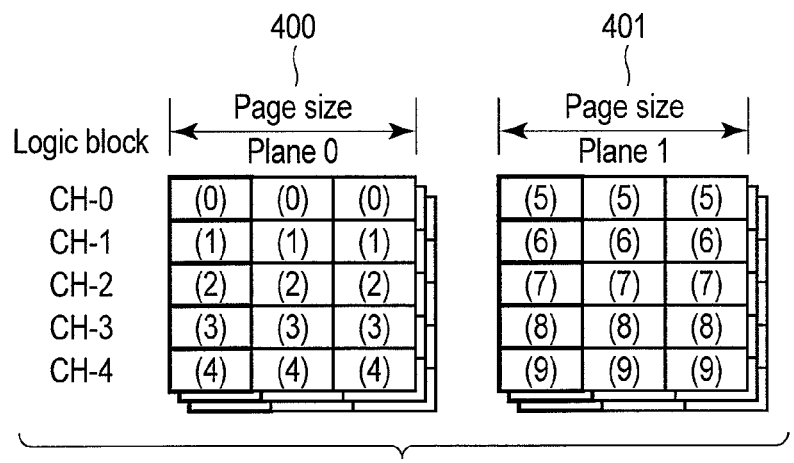
F I G. 4A
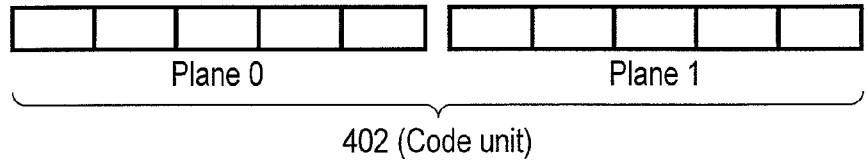
F I G. 4B
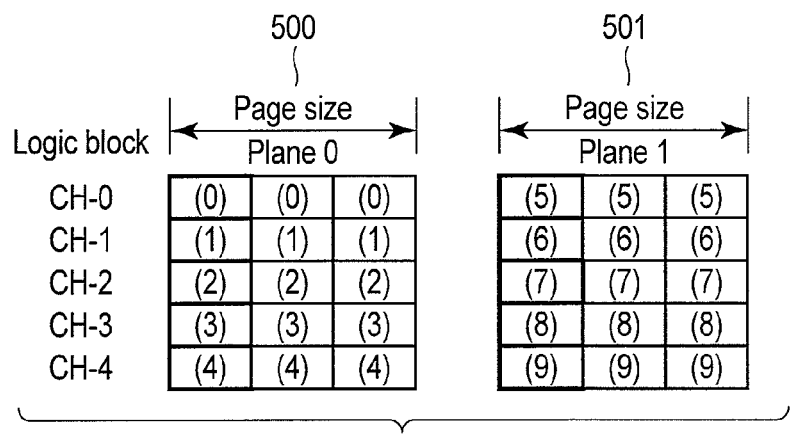
F I G. 5A
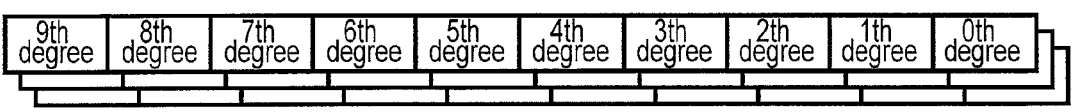
F I G. 5B

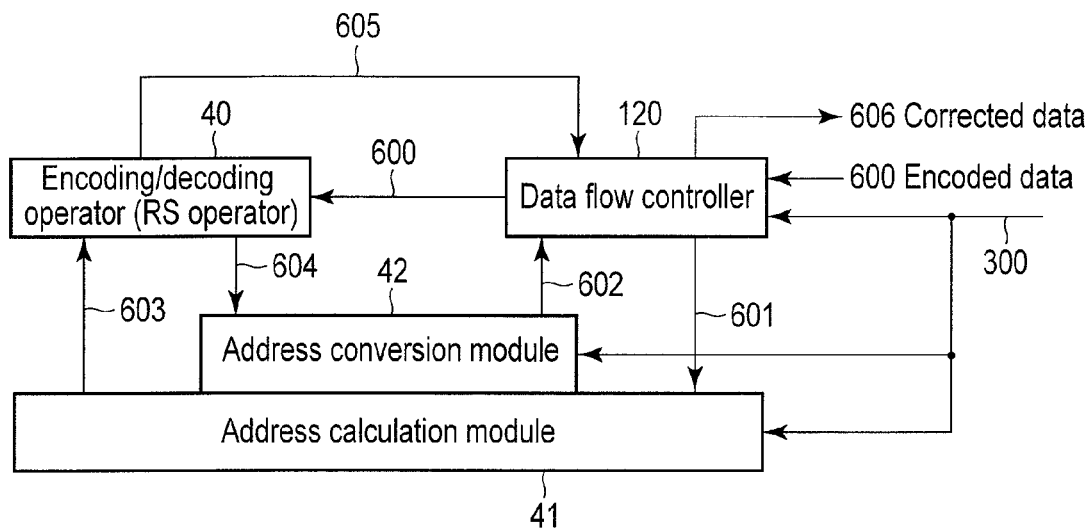
F I G. 6
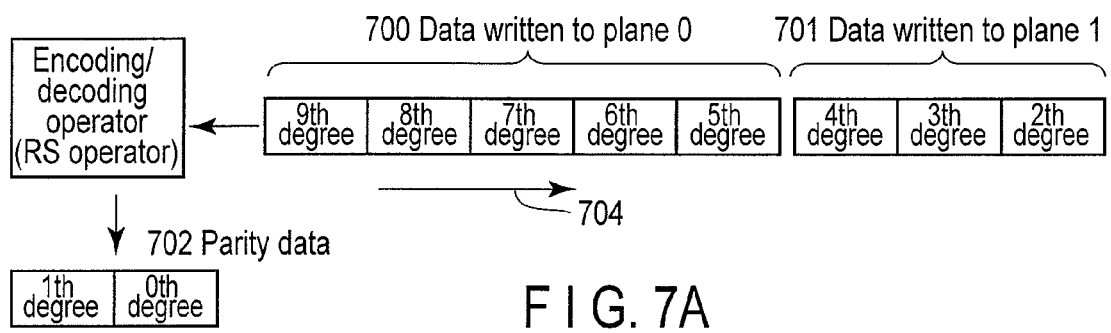
F I G. 7A
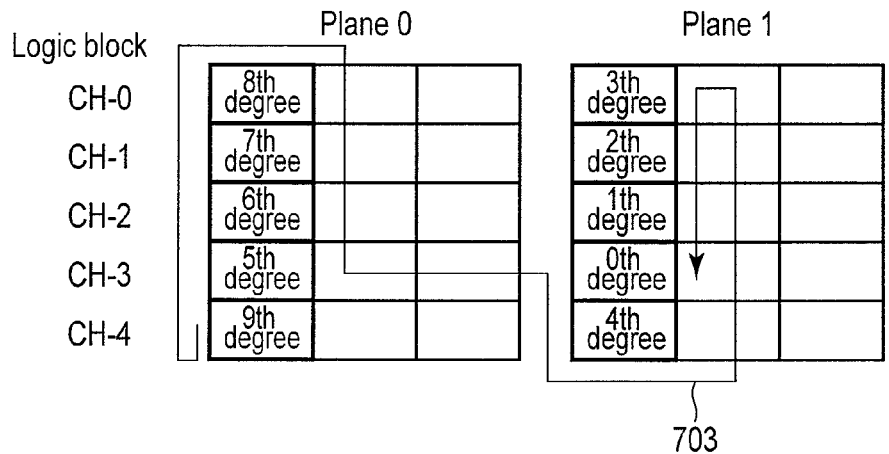
F I G. 7B

| Logic block | Plane 0 | | |
|---|---|---|---|
| CH-0 | 8th degree | | |
| CH-1 | (1th degree) | | |
| CH-2 | 7th degree | | |
| CH-3 | 6th degree | | |
| CH-4 | 9th degree | | |

F I G. 9A

| Logic block | Plane 1 | | |
|---|---|---|---|
| CH-0 | 4th degree | | |
| CH-1 | 3th degree | | |
| CH-2 | 2th degree | | |
| CH-3 | 0th degree | | |
| CH-4 | 5th degree | | |

F I G. 9B

| Logic block | Plane 0 | | |
|---|---|---|---|
| CH-0 | (8th degree) | | |
| CH-1 | 1th degree | | |
| CH-2 | (7th degree) | | |
| CH-3 | (6th degree) | | |
| CH-4 | (9th degree) | | |

F I G. 9C

| Logic block | Plane 0 | | |
|---|---|---|---|
| CH-0 | 8th degree | | |
| CH-1 | 7th degree | | |
| CH-2 | 6th degree | | |
| CH-3 | 5th degree | | |
| CH-4 | 9th degree | | |

F I G. 10A

| Logic block | Plane 1 | | |
|---|---|---|---|
| CH-0 | 3th degree | | |
| CH-1 | 2th degree | | |
| CH-2 | 1th degree | | |
| CH-3 | 0th degree | | |
| CH-4 | 4th degree | | |

F I G. 10B

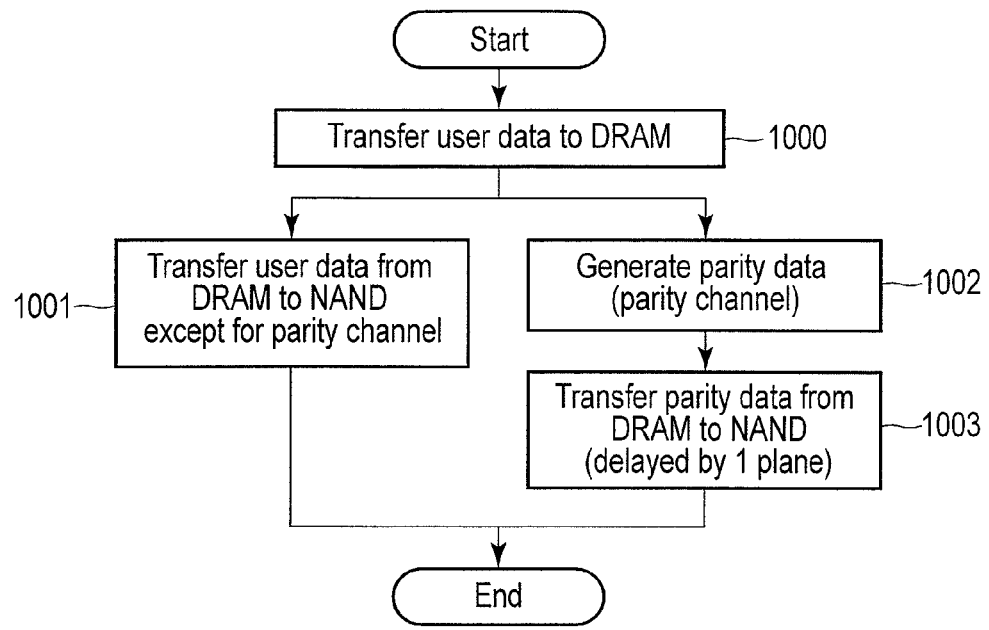
F I G. 14
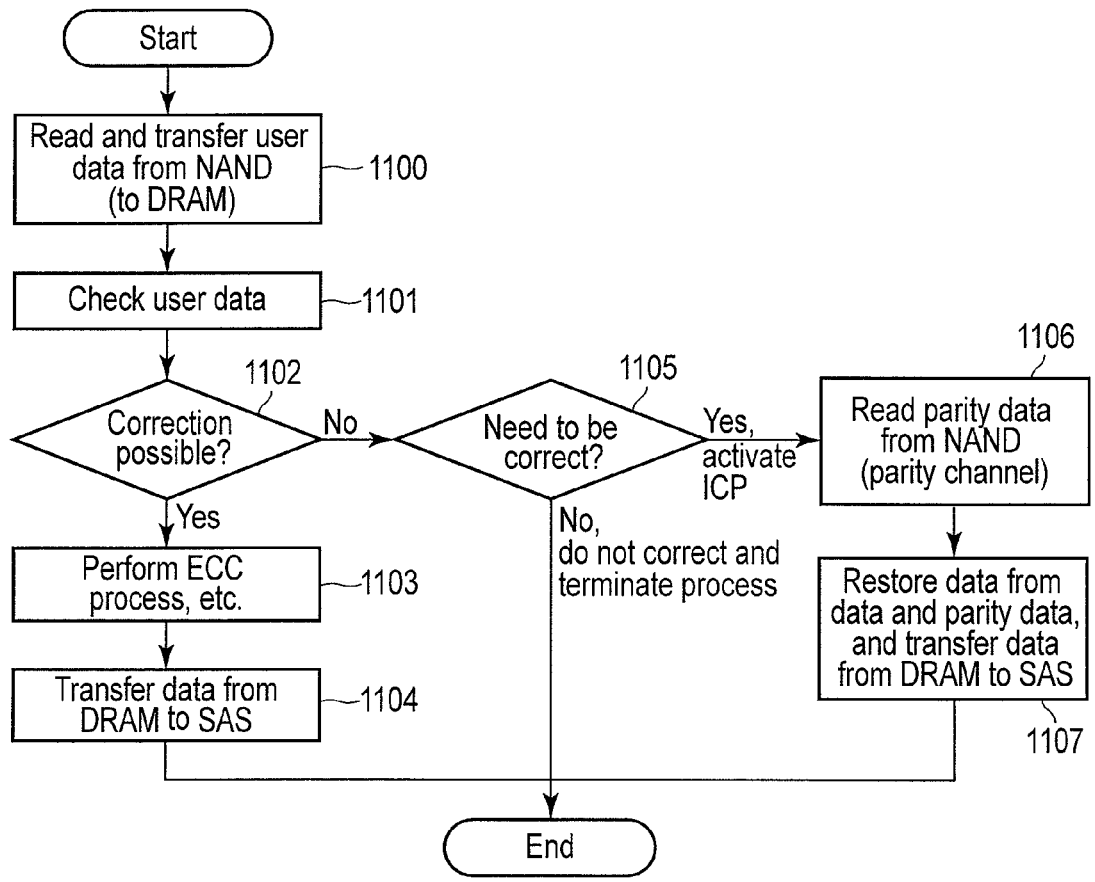
F I G. 15

DATA STORAGE APPARATUS AND APPARATUS AND METHOD FOR CONTROLLING NONVOLATILE MEMORIES

CROSS-REFERENCE TO RELATED APPLICATIONS

This application is based upon and claims the benefit of priority from prior Japanese Patent Application No. 2010-288830, filed Dec. 24, 2010, the entire contents of which are incorporated herein by reference.

FIELD

Embodiments described herein relate generally to a data storage apparatus using nonvolatile memories as storage media, and also to an apparatus and method for controlling nonvolatile memories.

BACKGROUND

In recent years, solid state drives (SSDs) have been developed as data storage apparatuses, each using NAND flash memories (hereinafter referred to as "flash memories" in some cases) that are rewritable nonvolatile memories.

Most SSDs are of a multi-channel type, in which flash memories are managed in units of channels, and data is written to channels in parallel. In any SSD of the multi-channel type, the data (user data) to be written in each channel is used, generating error correction codes (i.e., Reed-Solomon (RS) codes, hereinafter called "parity data" in some cases), which can perform an inter-channel parity (ICP) correction process. These error correction codes are stored in the flash memories of some channels selected from the plurality of channels.

In the SSD of the multi-channel type, parity data capable of correcting data between the channels is generated and stored in the selected channels. Data to be stored in the flash memories is managed in the SSD, in the form of logic blocks. Encoded data containing the parity data is allocated to a given location (storage location) in the logic block. This process of storing the encoded data may influence the write process, which is an SDD function.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a block diagram explaining the configuration of an ICP module according to the embodiment;

FIGS. 4A and 4B are diagrams explaining a data management method according to the embodiment;

FIGS. 5A and 5B are diagrams outlining a method of managing encoded data containing the parity data according to the embodiment;

FIG. 6 is a diagram explaining how data is input and output in a decoding process according to the embodiment;

FIGS. 7A and 7B are diagrams explaining the encoding process according to the embodiment;

FIGS. 9A, 9B and 9C are diagrams explaining an interface control for the channels, according to the embodiment;

FIGS. 10A and 10B are diagrams explaining the interface control for the channels, according to the embodiment;

FIG. 14 is a flowchart explaining an ICP process according to the embodiment; and FIG. 15 is a flowchart explaining another ICP process according to the embodiment.

DETAILED DESCRIPTION

Various embodiments will be described hereinafter with reference to the accompanying drawings.

In general, according to one embodiment, a data storage apparatus comprises a channel controller, an encoding module, and a data controller. The channel controller is configured to control data input to, and output from, nonvolatile memories for channels. The encoding module is configured to generate encoded data for which an inter-channel error correction process, using data stored in each of the nonvolatile memories. The data controller is configured to manage the encoded data in units of logic blocks when the channel controller writes the encoded data in parallel to the channels, and to allocate parity data contained in the encoded data to one plane in each logic block.

[Configuration of the Data Storage Apparatus]

Figure 1:
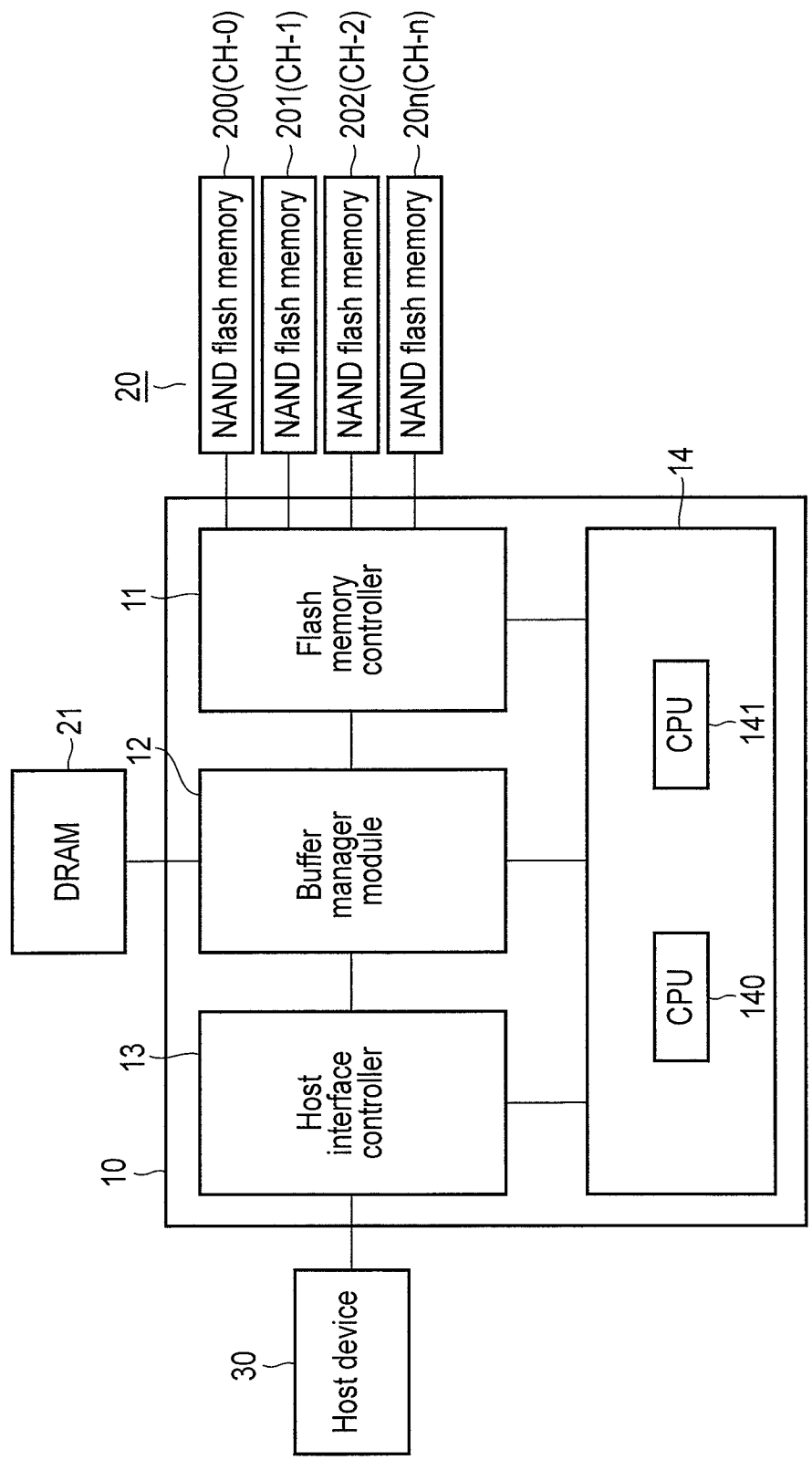
FIG. 1 is a block diagram explaining the configuration of a data storage apparatus according to an embodiment.

FIG. 1 is a block diagram explaining the configuration of a data storage apparatus according to an embodiment.

As shown in FIG. 1, the data storage apparatus according to the embodiment is a solid state drive (SSD). The apparatus has an SSD controller 10, NAND-type flash memories (flash memories) 20, and a buffer memory 21 constituted by a dynamic random access memory (DRAM).

The flash memories 20 are the data storage media used in the SSD, and are flash memory chips. The SSD is a multi-channel type having flash memories 200 to 20n, which are associated with channels CH-0 to CH-n, respectively. This embodiment, for example in case of n=4, has five flash memories 200 to 204 associated with five channels CH-0 to CH-4, for the sake of convenience.

The SSD controller 10 has a flash memory controller 11, a buffer manager module 12, a host interface controller 13, and a sub-system module 14.

Figure 2:
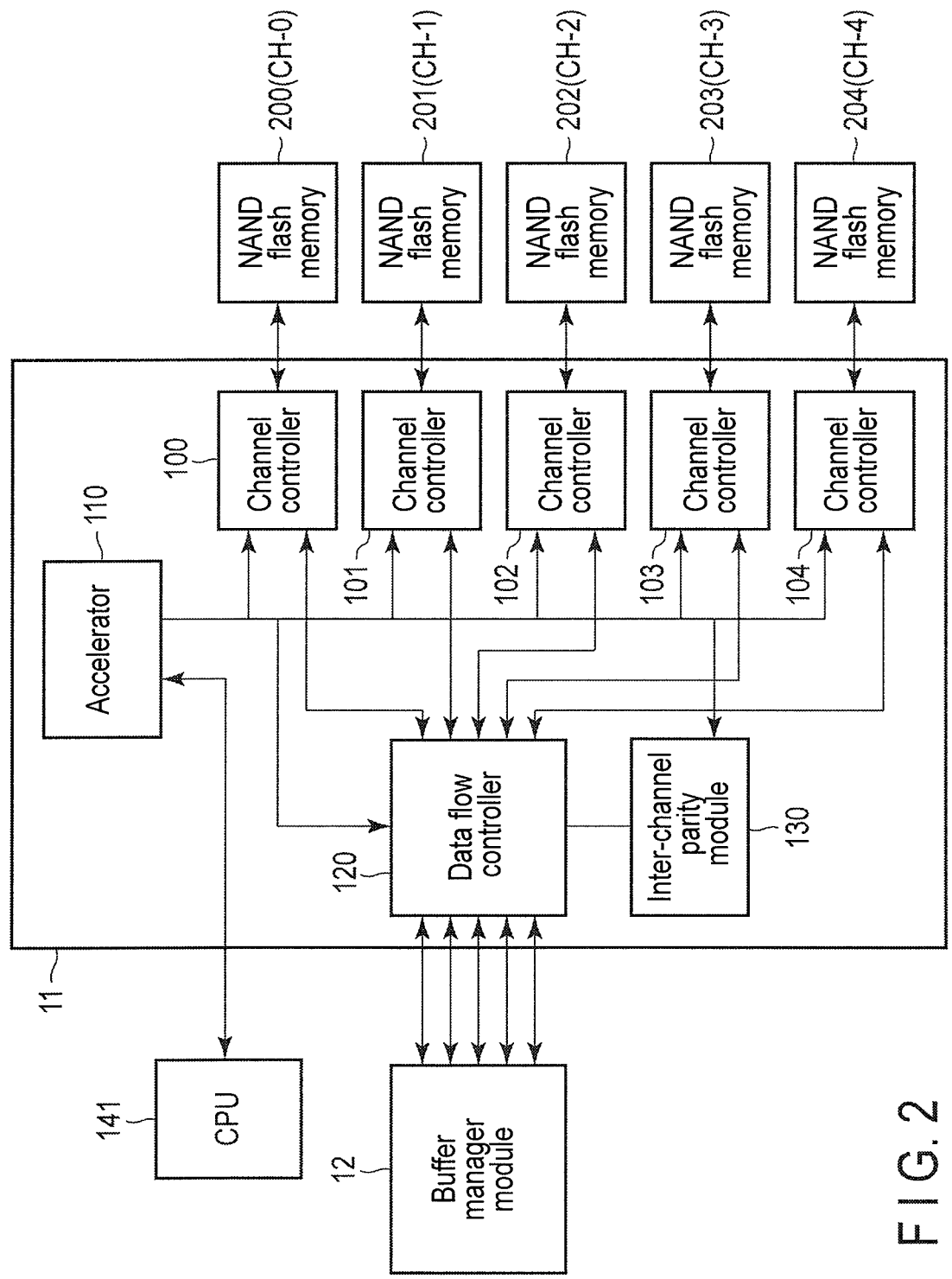
FIG. 2 is a block diagram explaining the configuration of a flash memory controller according to the embodiment.

The flash memory controller 11 performs a read/write control and a data transfer control on the flash memories 200 to 204 (see FIG. 2). The buffer manager module 12 controls the buffer memory 21, ultimately controlling the data transfer to and from the buffer memory 21. The buffer memory 21 temporarily stores the data to be written in the flash memories 200 to 204 and the data read from the flash memories 200 to 204. The buffer memory 21 stores the statistical data representing the number of times each flash memory has been accessed, and the address conversion data for managing the data stored in the flash memories 200 to 204.

The host interface controller 13 controls the transfer of data and commands between the SSD and a host device 30. The host device 30 is, for example, the interface controller of the Serial ATA (SATA) standard incorporated in a personal computer.

The sub-system module 14 has a first microprocessor (CPU) 140 and a second microprocessor (CPU) 141, and controls the other components of the SSD controller 10. More precisely, the first CPU 140 controls the buffer manager module 12 and host interface controller 13, and the second CPU 141 controls the flash memory controller 11 and buffer manager module 12, causing them to execute commands coming from the host device 30, thereby writing and reading data to or from the flash memories 200 to 204.

(Configuration of the Flash Memory Controller)

As shown in FIG. 2, the flash memory controller 11 includes channel controllers 100 to 104, an input output per second (IOPS) accelerator (hereinafter called "accelerator") 110, a data flow controller 120, and an inter-channel parity module 130. The channel controllers 100 to 104 are associated with the channels CH-0 to CH-4, respectively.

The accelerator 110 is a main controller for controlling the channel controllers 100 to 104, data flow controller 120 and ICP module 130 and also for controlling the data transfer to and from them. The accelerator 110 further controls a command process, in cooperation with the firmware (i.e., CPU 141).

The channel controllers 100 to 104 control the interface (i.e., data transfer) with the flash memories 200 to 204 associated with the channels CH-0 to CH-4, respectively. That is, the flash memory controller 11 is configured to control the flash memories 200 to 2004 that the channel controllers 100 to 104 control in parallel for the channels CH-0 to CH-4, respectively.

The data flow controller 120 controls the data transfer between the channel controllers 100 to 104 and the inter-channel parity module 130. Further, the data flow controller 120 controls the data transfer between the channel controllers 100 to 104 and the buffer manager module 12. The inter-channel parity module 130 is a data protection module configured to perform an inter-channel parity (ICP) error correction process if errors are made, as will be described later. Hereinafter, the inter-channel parity module 130 may be referred to as "ICP module 130" in some cases.

As shown in FIG. 3, the ICP module 130 has an encoding/decoding operator 40, an address calculation module 41, and an address conversion module 42. In this embodiment, the encoding/decoding operator (hereinafter called "RS operator") 40 encodes data in the Reed-Solomon encoding method, and decodes Reed-Solomon codes. As described later, the RS operator 40 performs an encoding process, thereby generating parity data, and performs a decoding process, generating correction data 302.

The data stored in each of the flash memories 200 to 204 associated with the channels CH-0 to CH-4, respectively, contains ECC data. The channel controllers 100 to 104 perform an ECC process, thereby protecting the data items stored in the flash memories 200 to 204. The ICP module 130 according to this embodiment combines the data items for different channels and generates encoded data, thereby accomplishing the inter-channel data protection.

The RS operator 40 is constituted by a plurality of operators in order to process data at high speed and configured to perform a pipeline parallel process. Alternatively, the RS operator 40 may be constituted by an operator that processes data in units of several bytes.

(Inter-Channel Parity (ICP) Process)

The ICP process (i.e., inter-channel data protection process) will be explained with reference to FIG. 3 to FIG. 15.

FIGS. 4A and 4B are diagrams explaining a data management method according to the embodiment. In this embodiment, the flash memory controller 11 manages, in units of logic blocks, the data to transfer via the channel controllers 100 to 1004 to the flash memories 200 to 204 associated with the channels CH-0 to CH-4, respectively.

As shown in FIG. 4A, the logic blocks according to this embodiment are defined by the channels CH-0 to CH-4, planes and logic pages. The plane is a unit of region, to which the storage areas for the channels CH-0 to CH-4 (i.e., flash memories 200 to 204) are logically allocated. In this embodiment, the data managed in the respective channels CH-0 to CH-4 is divided into two planes (i.e., plane 0 and plane 1). The logic pages (i.e., page sizes 400 and 401) are matrices of channels CH-0 to CH-4 and two planes (plane 0 and plane 1). Hereinafter, Plane 0 will be referred to as "plane 0," and plane 1 will be referred to as "plane 1."

Each logic block is constituted by a plurality of logic pages. In the present embodiment, the matrix elements of each plane are, for example, one-byte data items. The ICP module 130 generates encoded data 402 is a data unit in the inter-channel ECC process (i.e., data unit to be protected). As shown in FIG. 4B, the encoded data 402 is a combination of two one-byte data items extracted from the planes 0 and 1 for one channel (CH-0, CH-1, CH-2, CH-3 or CH-4). This encoding (data protection) is performed on all logic blocks.

In the present embodiment, one logic page (page sizes 500 and 501) is regarded as constituting one logic block, for the sake of convenience. Hence, the logic pages will be hereinafter described as identical to logic blocks. Also in this embodiment, an encoding process (later described) is performed, generating encoded data 502 containing parity data 503 as shown in FIG. 5B. If the encoded data 502 is allocated to the logic block, the parity data 503 will be allocated, by all means, to one plane (0 or 1).

The ICP process (i.e., data protection process), more precisely the encoding process and decoding process, will be explained with reference to the flowcharts of FIGS. 14 and 15.

First, the flash memory controller 11 processes the planes 0 and 1 of each of the channels CH-0 to CH-4, in order to make accesses to the flash memories 200 to 204. To process a write command, the controller 11 combines the planes 0 and 1, as one request unit (i.e., one write command). This write process, which is known as "multiple-plane write," can increase the write process (shorten the programming time).

As shown in the flowchart of FIG. 14, user data is transferred from the host interface controller 13 (hereinafter called "SAS" in some cases) to the buffer memory 21 (Block 1000). The flash memory controller 11 transfers the user data from the buffer memory 21 to the flash memories associated with all channels, except the channel storing parity data, thereby writing the user data in the flash memories (Block 1001).

Then, the ICP module 130 performs an encoding process, generating encoded data 502 as shown in FIG. 5B. In the encoding process, the ICP module 130 prepares write data, in units of logic pages (logic blocks), and inputs the write data to the RS operator 40. The RS operator 40 generates parity data (Block 1002).

As shown in FIG. 3, the data flow controller 120 transfers, to the RS operator 40, the write data (source data) that the channel controllers 100 to 104 have read from the flash memories 200 to 204. Further, the data flow controller 120 transfers the parity data generated by the RS operator 40, to any one of the channel controllers 100 to 104 (Block 1003). The channel controllers 100 to 104 perform a write process on the encoded data composed of the parity data generated and the source data (data other than the parity data), in units of logic pages.

Figure 11:
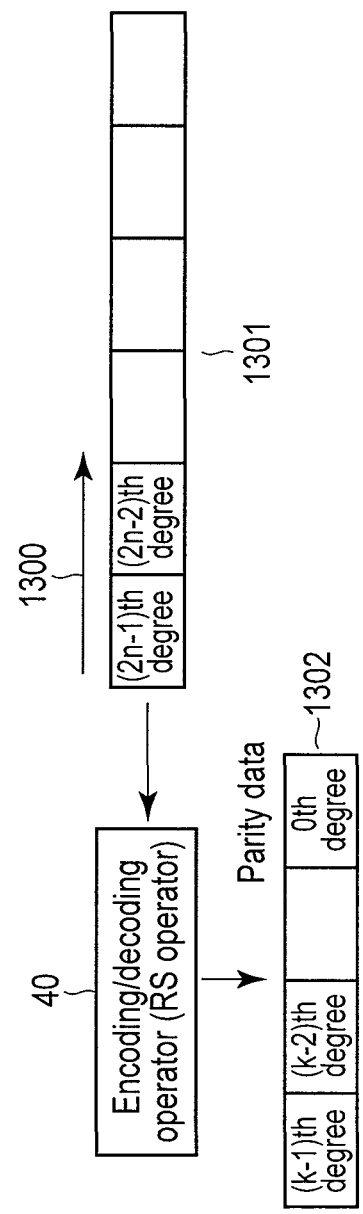
FIG. 11 is a diagram explaining an encoding process performed by an RS operator according to the embodiment.

FIG. 11 is a diagram explaining the encoding process performed by the RS operator 40. The RS operator 40 performs an RS encoding. More specifically, the RS operator 40 generates k-byte parity data 1302 if source data 1301 of 2n-k bytes, having code length of 2n, is input in the order of arrow 1300.

Figure 12:
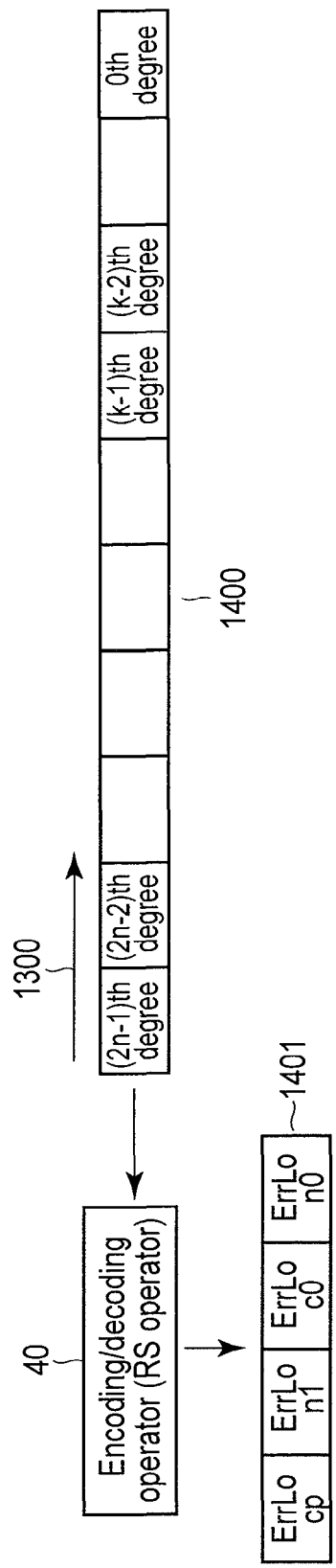
FIG. 12 is a diagram explaining a decoding process performed by an RS operator according to the embodiment.

FIG. 12 is a diagram explaining the decoding process (later described) performed by the RS operator 40. As shown in FIG. 12, the parity data items 1302 are arranged in the source data 1301, and the degrees of an encoded polynomial are allocated to the parity data items. As a result, encoded data 1400 is generated.

The present embodiment is based on the assumption that the storage location of a logic page that contains the parity data generated in the encoding process is designated in units of planes. That is, this embodiment proposes a method of managing data, in which the parity data used in the inter-channel parity process (data protection) is managed in a logic block in a specific manner.

The encoding process according to the embodiment will be explained in detail, with reference to FIGS. 7A and 7B.

Assume that the encoded data has a code length of 10 bytes in the present embodiment. Then, two bytes of the encoded data is parity data 702. In order to encode data, the source data 700 of the plane 0 and the source data 702 of the plane 1 are input to the RS operator 40 as shown in FIG. 7A (in the order indicated by arrow 704). The RS operator 40 generates parity data 702 from the source data items 700 and 701.

Next, as shown in FIG. 7B, the channel controllers 100 to 104 store the source data items 700 and 701 and the parity data 702 thus generated, in mutual association, in the plane 0 or 1 of the logic block. The parity data 702 is stored in the plane 1 in this instance (Block 1002). In this case, the parity data 702 is stored in the planes 1 of the channels CH-2 and CH-3, in the same number of bytes.

That is, as shown in FIG. 7B, the descending order of parity data degrees and the ascending order of the physical numbers of the logic blocks are stored in mutual association, during the process of selecting the channel for which the parity data 702 should be stored. That is, the first-degree parity data, i.e., high-degree data, is allocated to a channel of a small number (i.e., CH-2 in this instance).

Other encoded data (encoded data other than the parity data) is stored, associated with the numbers, in the descending order of degrees, starting at the storage location of the logic block of the lowest degree (0th degree) and in the plane (i.e., plane 0 in this case) opposite to the plane holding the parity data. In this case, the plane is the plane 0 of the channel CH-4. That is, the start channel number for each plane is a number calculated as "(storage channel number at the lowest degree+1)/total channel number." At this point, the channels (i.e., CH-2 and CH-3) designated as the storage site for the parity data are skipped for some time. After the encoded data of the second degree or any higher degree is completely stored, the storage of the parity data is started.

That is, in order to store the parity data, the logic blocks are managed as described above, thereby performing a process wherein the degree of the encoded data is associated with the location data contained in the logic block. In the encoding process, parity data of the first degree of any lower degree is generated after all encoded data of the second degree or any higher degree has been input. The parity data thus generated is stored in one plane (here, plane 1) of the logic block. As a result, the parity data can be stored, following the encoded data other than the parity data.

FIGS. 9A, 9B and 9C and FIGS. 10A and 10B are diagrams explaining two different interface controls the channel controllers 100 to 104 may perform during the encoding process.

More precisely, FIGS. 9A, 9B and 9C show a method of storing the parity data in both the plane 0 the plane 1, unlike in the data management method described above. That is, as shown in FIG. 9A, the channel controllers 100 to 104 write, in phase 0, the source data (i.e., encoded data other than the parity data) in the plane 0 of any channel other than the channel CH-1.

Next, as shown in FIG. 9B, the channel controllers 100 to 104 write, in phase 1, the parity data (0th degree) in the plane 1 of the channel CH-3, and write the source data in the plane 1 of any other channel. Then, as shown in FIG. 9C, the channel controllers 100 to 104 write, in phase 2, the parity data (first degree) in the plane 0 of the channel CH-1.

In such a data management method, however, channels for which a process that should be performed on both the plane 0 and the plane 1, inevitably exist in the process performed in the phase 1. Consequently, only one plane (i.e., plane 1 in this instance) can be processed. The other plane (i.e., plane 0) must therefore be processed in another phase.

By contrast, in the data management method according to this embodiment, the channel controllers 100 to 104 write, in phase 0, the source data (i.e., encoded data other than the parity data) in the plane 0 of each channel, as shown in FIG. 10A. Next, as shown in FIG. 10B, the channel controllers 100 to 104 write, in phase 1, the parity data (first degree) in the plane 1 of the channel CH-3, and write the parity data (0th degree) in the plane 1 of the channel CH-3. Hence, in the process of phase 1, the channel controllers 100 to 104 can write first the source data and then the parity data (0th and first degrees), in the plane 1 of any channel other than the channels CH-2 and CH-3.

In the data management method according to the embodiment, each logic block is managed as described above, thereby storing the parity data in the plane 1. The process of storing the parity data (0th and first degrees) in the plane 1 is thereby completed in the phase 1 only, not in different phases. This helps to achieve a high-speed write process during the encoding process.

(Decoding Process)

As shown in the flowchart of FIG. 15, the flash memory controller 11 reads user data from the flash memory of each channel and transfers the user data to the buffer memory 21 during the read process (Block 1100). At this point, the flash memory controller 11 uses ECC, checking the user data that has been read (Block 1101). If the user data can be corrected (YES in Block 1102), the flash memory controller 11 performs error correction using the ECC, correcting the user data (Block 1103). The user data corrected by using the ECC is transferred from the buffer memory 21 to the host interface controller 13 (Block 1104).

If the channel controllers 100 to 104 detect errors while the data is being accessed (NO in Block 1102) and if the ECC can no longer correct errors (YES in Block 1105) and the data should therefore be restored, the flash memory controller 11 causes the ICP module 130 to perform the inter-channel parity (ICP) process.

The ICP module 130 uses the parity data read from the flash memory (Block 1106) and then performs a decoding process (i.e., data restoring process) (Block 1107).

How the decoding process is performed in the method of managing the encoded data (i.e., source data and parity data) generated in the encoding process according to this embodiment will be explained with reference mainly to FIG. 3 and FIG. 6.

First, as shown in FIG. 6, the data flow controller 120 transfers encoded data 600 read from the flash memories 200 to 204, to the RS operator 40 through the channel controllers 100 to 104. At this time, the data flow controller 120 sequentially reads data from the logic blocks managed, at the start position of the plane 0 (i.e., channel CH-0 of plane 0), which is opposite to the storage side of parity data, as is illustrated in FIG. 7B (see arrow 703).

Figure 8:
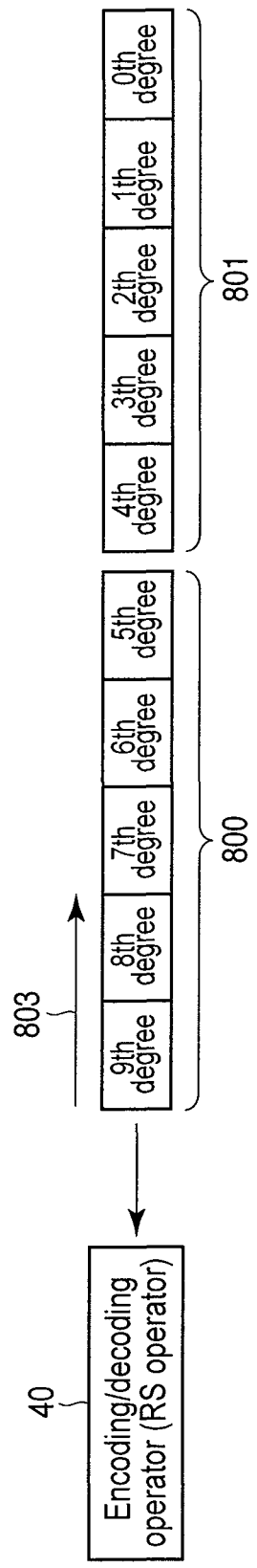
FIG. 8 is a diagram explaining the decoding process according to the embodiment.

Hence, as shown in FIG. 8, the encoded data items 800 and 801 read for each of the channels CH-4 of plane 0 are input to the RS operator 40 in the order of arrow 803 during the decoding process. In this case, the channels CH-2 and CH-3 of the plane 1 in which the parity data is stored need not be skipped.

FIG. 12 is a diagram explaining the decoding process performed by the RS operator 40. The RS operator 40 performs the decoding process as encoded data 1400 is input to it in the order of arrow 1300 as shown in FIG. 12. If the encoded data 1400 contains errors, the RS operator 40 outputs error correction data 1401 that contains error locations (ErrLo) and an error pattern (ErrPt).

More precisely, as shown in FIG. 3 and FIG. 6, the RS operator 40 outputs error correction data (303 and 605) containing the error locations and error pattern, to the data flow controller 120. The data flow controller 120 transfers data 606 detected to have errors and corrected by using the error correction data and now free of errors, to the buffer manager module 12 (Block 1107).

In other words, the data flow controller 120 transfers the corrected data 606 to the channel controllers 100 to 104 during the write process. During the read process, the data flow controller 120 transfers the corrected data 606 to the buffer manager module 12. The buffer manager module 12 transfers the buffer manager module 12 via the buffer memory 21 to the host interface controller 13.

Figure 13:
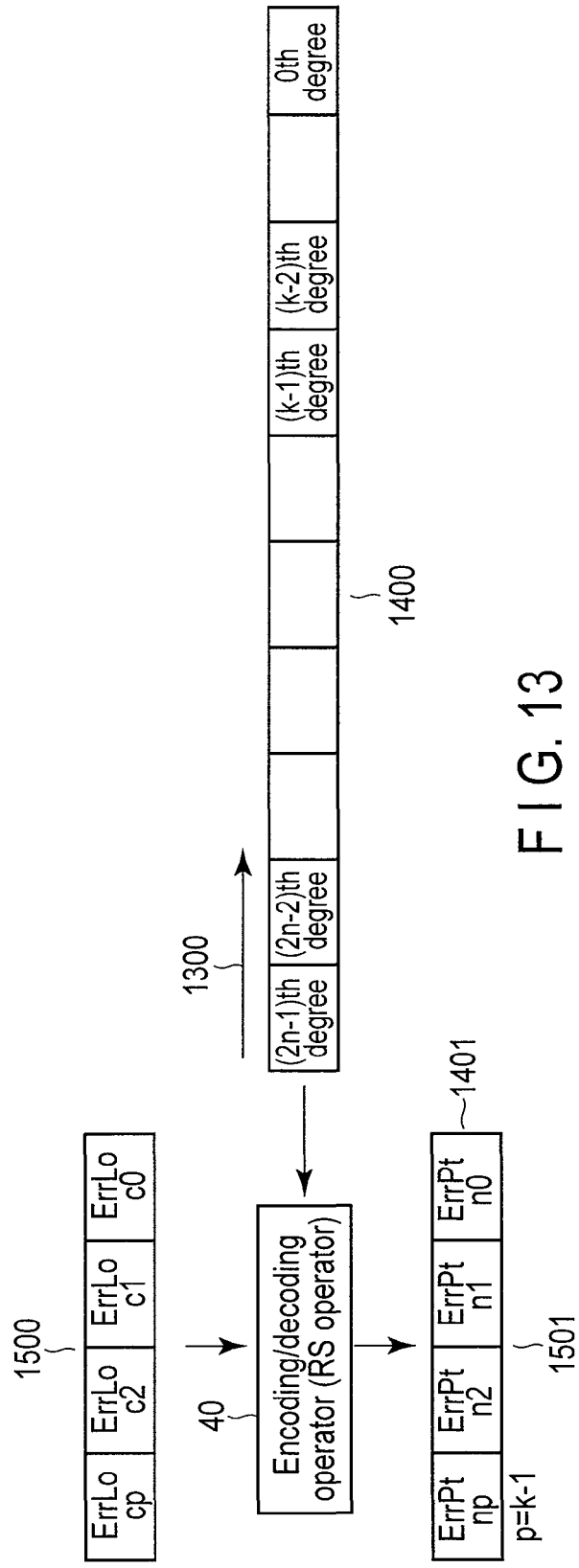
FIG. 13 is a diagram explaining another decoding process performed by an RS operator according to the embodiment.

FIG. 13 is a diagram explaining another decoding process related to erasure correction. If the RS operator 40 receives error location data 1500 specifying the error locations, prior to the decoding process, it uses the error location data 1500 as preliminary data in the decoding process. To be more specific, on receiving error location data 307 from, for example, the CPU 141 as shown in FIG. 3, the RS operator 40 uses this data 307 as preliminary data in the decoding process. In this case, the RS operator 40 need not calculate the error locations. The RS operator 40 can therefore output error correction data (303 and 605) at high speed.

As described above, the flash memory controller 11 according to this embodiment manages data in units of logic blocks defined by channels CH-0 to CH-4 and planes 0 and 1, and processes the planes 0 and 1 as smallest units of data. During the decoding process, the ICP module 130 performs the ICP error correction process, in units of encoded data items, over the channels CH-0 to CH-4. Therefore, the ICP module 130 must associate the location data items (i.e., channel numbers CH-0 to CH-4 and plane numbers 0 and 1) with the degrees of encoded data items (i.e., order).

In this embodiment, the data flow controller 120 performs a control during the encoding process as described above, thereby associating the order of inputting data items to the RS operator 40 with the channel numbers to which the encoded data items are allocated and in which they are stored. The channel controllers 100 to 104 allocate the encoded data items to, and store them in, the respective channels of the logic block.

In order to associate the location data contained in the logic block with the degree of the encoded data during the decoding process, the ICP module 130 has the address calculation module 41 and address conversion module 42 as shown in FIG. 3 and FIG. 6.

As shown in FIG. 6, the data flow controller 120 transfers the data (encoded data 600) to the RS operator 40. Nonetheless, the encoded data items 1200 and 1201 are input to the RS operator 40, in destroyed relation in terms of degree. Degree data (301, 603) representing the degree of the input data (i.e., encoded data) must therefore be input, as attribute data, to the RS operator 40.

As shown in FIG. 3 and FIG. 6, the degree data (301, 603) is input to the RS operator 40 by the address calculation module 41. The address calculation module 41 receives storage location data 300 about the parity data, from the channel controllers 100 to 104. The storage location data 300 represents the numbers (CH-3 and CH-3) of the channels and also plane number (i.e., 1) to which the parity data contained in the logic block is addressed.

The address calculation module 41 performs such address calculation as shown in FIG. 12, obtaining, as degree data (301, 603), the location data (Fn) contained in the encoded data. More specifically, the address calculation module 41 receives the channel number of the input data and the location data (304, 601) contained in the logic block and representing the channel number and plane number of the data input to the RS operator 40. That is, the address calculation module 41 inputs, to the RS operator 40, the location data (Fn) representing the channel number and plane number of the input data and also the location data (Fn) representing the channel number and plane number of the channel in which the parity data should be stored. Nonetheless, such an address calculation module as shown in FIG. 3 and FIG. 6 need not be used as in the encoding process, because the storage location of the parity data is skipped.

The RS operator 40 associates the order of the encoded data items with the degrees thereof, on the basis of the location data (301, 603) received from the address calculation module 41, as described above, thereby detecting and correcting the errors contained in the encoded data. The RS operator 40 outputs the error correction data (303 and 605), which is the result of the decoding process, to the data flow controller 120.

In accordance with the error correction data (605) output from the RS operator 40, the data flow controller 120 outputs correction data 606. An inter-channel data correction can thereby be achieved in the decoding process during the inter-channel parity process, by reading all data from the logic block and transferring the data to the RS operator 40.

In order to output the corrected data 606, the data flow controller 120 needs corrected location data (Fn^−1) that associates the error location data obtained by the RS operator 40 with the corrected location data contained in the logic block. The corrected location data can be generated by the address conversion module 42 shown in FIG. 3 and FIG. 6.

As indicated above, the ECC process may be performed for each channel. Then, an erasure correction may be accomplished to generate error location data (307) in the inter-channel parity process according to this embodiment. In this case, the address calculation module 41 can convert the plane location represented by the error location (307) to the degree data contained in the code. The address conversion module 42 can therefore be dispensed with.

As has been described, in the SSD according to this embodiment, the ICP module 130 performs an encoding process, generating encoded data wherein the source data and the parity data are associated in the logic block. In this case, the parity data is stored in one plane (i.e., plane 1) of the logic block. Therefore, the storage location of the parity data can be set to be a continuous channel number. This can increase the speed of the write process, particularly during the encoding process. During the decoding process, too, the order in which to input the encoded data items to the RS operator 40 can be efficiently controlled. In brief, the present embodiment can enhance the efficiency of storing the encoded data containing the parity data that achieves the ICP function.

The various modules of the systems described herein can be implemented as software applications, hardware and/or software modules, or components on one or more computers, such as servers. While the various modules are illustrated separately, they may share some or all of the same underlying logic or code. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data storage apparatus comprising:
    a channel controller configured to control data input to, and output from, a plurality of nonvolatile memories associated with channels;
    an encoding module configured to generate encoded data associated with an inter-channel error correction process, using data stored in the nonvolatile memories; and
    a data controller configured to:
        manage the encoded data in units of logic blocks when the channel controller writes the encoded data in parallel to the channels;
        allocate parity data contained in the encoded data to one of a first plane and a second plane in each of the logic blocks, wherein the logic block comprises a matrix of the channels, the first plane, and the second plane; and
        allocate source data to any channel other than the channel allocated to the parity data in the plane that stores the parity data.

2. The data storage apparatus of claim 1, further comprising a decoding module configured to perform an error detection/correction process on the encoded data.

3. The data storage apparatus of claim 2, wherein the decoding module is configured to receive the-location data, the location data comprising a channel number and a plane number, the channel number and the plane number indicating a positional relation between the logic block and the encoded data, while receiving the encoded data transferred from the data controller in the error detection/correction process.

4. The data storage apparatus of claim 1, wherein the data controller is configured to:
    associate the source data from which to generate the encoded data with degree data and location data, the degree data and location data both contained in the parity data.

5. A memory control apparatus for use in a data storage apparatus, comprising:
    a channel controller configured to control data input to, and output from, a plurality of nonvolatile memories associated with channels;
    an encoding module configured to generate encoded data for an inter-channel error correction process, using data stored in each of the nonvolatile memories; and
    a data controller configured to:
        manage the encoded data in units of logic blocks when the channel controller writes the encoded data in parallel to the channels;
        allocate the parity data contained in the encoded data to one of a first plane and a second plane in each of the logic blocks, wherein the logic block comprises a matrix of the channels, the first plane, and the second plane;
        allocate source data to any channel other than the channel allocated to the parity data in the plane that stores the parity data; and
        manage the parity data.

6. The memory control apparatus of claim 5, further comprising a decoding module configured to perform an error detection/correction process on the encoded data.

7. The memory control apparatus of claim 5, wherein the data controller is configured to:
    associate the source data from which to generate the encoded data with degree data and location data, the degree data and location data both contained in the parity data.

8. A method of controlling nonvolatile memories associated with channels in a data storage apparatus, the method comprising:
    generating encoded data for an inter-channel error correction process, using data stored in a plurality of nonvolatile memories; and
    managing the encoded data in units of logic blocks when a channel controller writes the encoded data in parallel to the channels, allocating the parity data contained in the encoded data to one of a first plane and a second plane in each of the logic blocks, wherein the logic block comprises a matrix of the channels, the first plane, and the second plane, and allocating source data to any channel other than the channel allocated to the parity data in the plane that stores the parity data.

9. A data storage apparatus comprising:
    a first controller configured to control nonvolatile memories associated with channels;
    an encoding module configured to generate encoded data associated with an inter-channel error correction process; and
    a second controller configured to:
        write the encoded data in parallel to each of the channels, wherein
        when logic blocks are configured using a first plane and a second plane, parity data contained in the encoded data is stored in either of the first plane and the second plane; and
        the parity data is allocated to a first channel, and source data is allocated to a second channel.

10. The data storage apparatus of claim 9, further comprising a decoding module configured to perform an error detection/correction process on the encoded data.

11. The data storage apparatus of claim 10, wherein the decoding module is configured to receive location data, the location data comprising a channel number and a plane number, the channel number and the plane number indicating a positional relation between the logic block and the encoded data, while receiving the encoded data transferred from the data controller in the error detection/correction process.

12. The data storage apparatus of claim 9, wherein the second controller is configured to:
    associate the source data from which to generate the encoded data with degree data and location data, the degree data and location data both contained in the parity data.

* * * * *